United States Patent
Chen et al.

(10) Patent No.: US 12,311,545 B2
(45) Date of Patent: May 27, 2025

(54) WALKING CONTROL METHOD, BIPED ROBOT AND COMPUTER-READABLE STORAGE MEDIUM

(71) Applicant: UBTECH ROBOTICS CORP LTD, Shenzhen (CN)

(72) Inventors: Chunyu Chen, Shenzhen (CN); Jie Bai, Shenzhen (CN); Yizhang Liu, Shenzhen (CN); Ligang Ge, Shenzhen (CN); Zheng Xie, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 426 days.

(21) Appl. No.: 18/090,457

(22) Filed: Dec. 28, 2022

(65) Prior Publication Data

US 2023/0202027 A1    Jun. 29, 2023

Related U.S. Application Data

(63) Continuation of application No. PCT/CN2021/131892, filed on Nov. 19, 2021.

(30) Foreign Application Priority Data

Mar. 22, 2021   (CN) .......................... 202110303627.4

(51) Int. Cl.
*B25J 9/16*     (2006.01)
*B62D 57/032*   (2006.01)

(52) U.S. Cl.
CPC .......... *B25J 9/1602* (2013.01); *B62D 57/032* (2013.01)

(58) Field of Classification Search
CPC .... B25J 9/1602; B62D 57/032; G05D 1/0223
See application file for complete search history.

(56) References Cited

U.S. PATENT DOCUMENTS

2020/0369333 A1*  11/2020  Lavalley ............. B25J 11/0035

FOREIGN PATENT DOCUMENTS

CN            112051735 A       12/2020

OTHER PUBLICATIONS

ISR for PCT/CN2021/131892.
Written opinions of ISA for PCT/CN2021/131892.

* cited by examiner

*Primary Examiner* — Basil T. Jos

(57) ABSTRACT

A walking control method for a biped robot includes: detecting whether the biped robot is in an unbalanced state; in response to detection that the biped robot is in the unbalanced state, obtaining a predicted balance step length corresponding to the biped robot in the unbalanced state; performing a smooth transition processing on the predicted balance step length according to a current movement step length of the biped robot to obtain a desired balance step length corresponding to the predicted balance step length; determining a planned leg trajectory of the biped robot according to the desired balance step length; and controlling a current swing leg of the biped robot to move according to the planned leg trajectory.

12 Claims, 11 Drawing Sheets

WALKING CONTROL METHOD, BIPED ROBOT AND COMPUTER-READABLE STORAGE MEDIUM

CROSS REFERENCE TO RELATED APPLICATIONS

The present application is a continuation-application of International Application PCT/CN2021/131892, with an international filing date of Nov. 19, 2021, which claims foreign priority of Chinese Patent Application No. 202110303627.4, filed on Mar. 22, 2021 in the China National Intellectual Property Administration, the contents of all of which are hereby incorporated by reference.

BACKGROUND

1. Technical Field

The present disclosure generally relates to biped robots, and particularly to a walking control method, a biped robot, and a computer-readable storage medium.

2. Description of Related Art

Robot technology has been widely used in many fields because of its great research value and application value. Biped robot control is an important research direction in the field of robot control technology. However, in the actual control process of a biped robot, the biped robot may suffer from the problem of being difficult to maintain a balanced state due to external disturbances (e.g., an external push) and/or internal disturbances.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
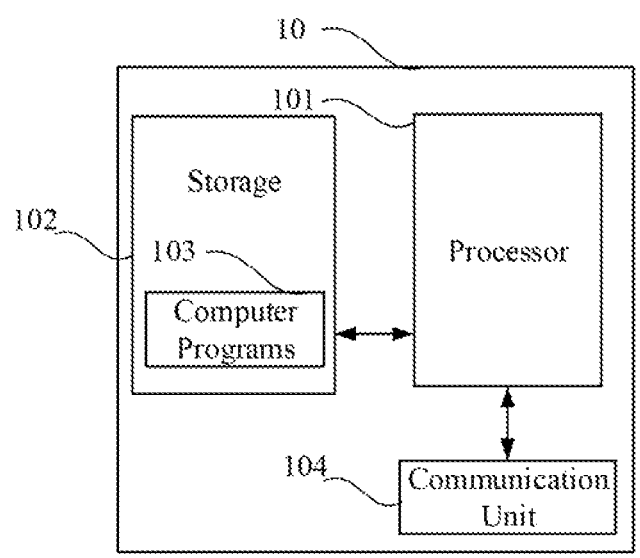
FIG. 1 is a schematic block diagram of a biped robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

When a loss of balance is detected, the robot according to embodiment of the present disclosure smooths the foot trajectory corresponding to the stability-maintaining step length that can restore the balance of the robot. The smoothed foot trajectory is then used to control the walking of the biped robot, thereby reducing the difference between the foot trajectory of the biped robot when it regains balance and the walking trajectory of the biped robot when it loses balance while allowing the biped robot to restore its balance. As a result, the step leaping phenomenon of biped robot can be avoided, and the reliability of robot can be improved.

Figure 3:
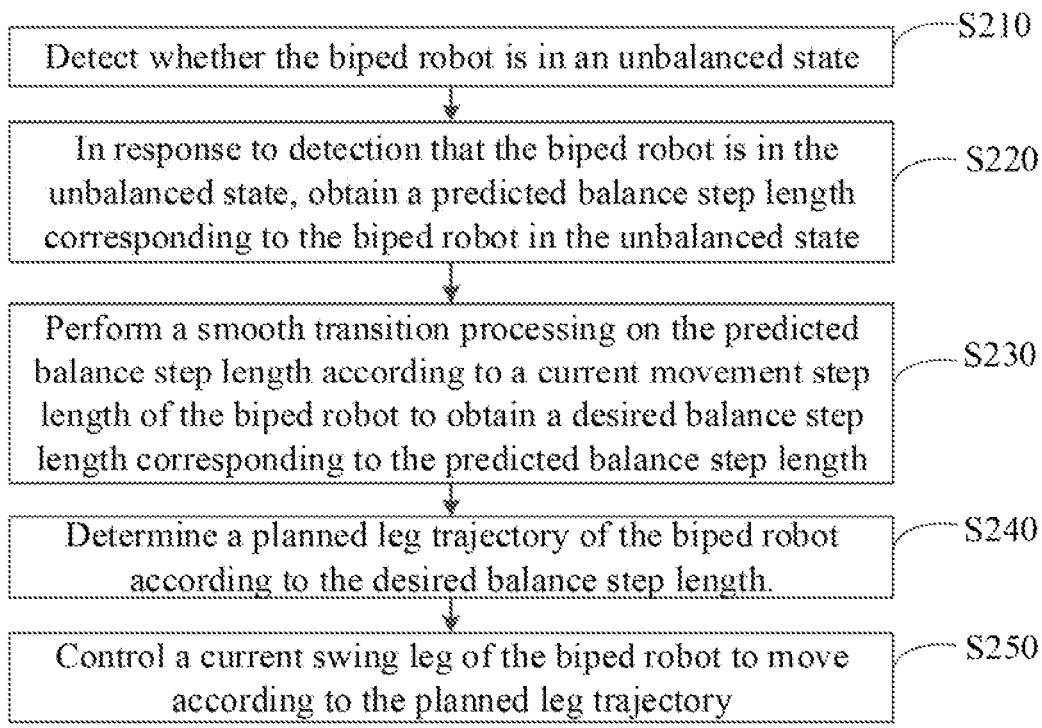
FIG. 3 is an exemplar flowchart of a robot walking control method according to one embodiment.

FIG. 1 shows a schematic block diagram of a robot 10 according to one embodiment. The robot 10 may include a processor 101, a storage 102, one or more executable computer programs 103 that are stored in the storage 102, and a communication unit 104. The storage 102, the processor 101, and the communication unit 104 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for controlling the robot 10, such as steps S210 to S250 in FIG. 3, are implemented.

The processor 101 may be an integrated circuit chip with signal processing capability. The processor 101 may be a central processing unit (CPU) a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot 10, such as a hard disk or at memory. The storage 102 may also be an external storage device of the robot 10 such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot 10. The storage 102 can also be used to temporarily store data that have been output or is about to be output.

Figure 9:
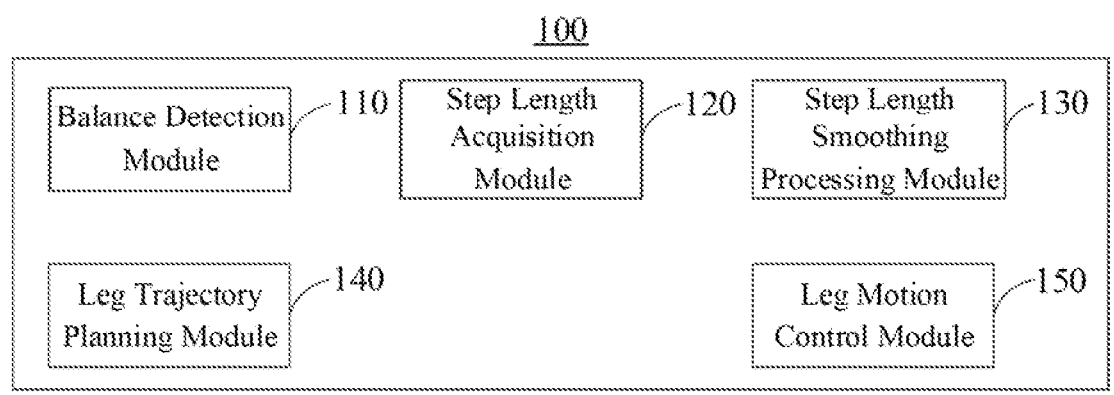
FIG. 9 is a schematic block diagram of a robot walking control device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 10. For example, the one or more computer programs 103 may be divided into a balance detection module 110, a step length acquisition module 120, a step length smoothing processing module 130, a leg trajectory planning module 140, and a leg motion control module 150 as shown in FIG. 9.

In one embodiment, the communication unit 104 is to establish a communication connection between electronic components through a network, and send and receive data through the network. The network includes a wired communication network and a wireless communication network. For example, the processor 101 can obtain a desired motion trajectory for the biped robot from a job planning device through the communication unit 104, and send motion control instructions to actuators of the biped robot through the communication unit 104, enabling the biped robot to in according to the motion control instructions.

It should be noted that the block diagram shown in FIG. 1 is only an example of the robot 10. The robot 10 may include more or fewer components than what is shown in FIG. 1, or have a different configuration than what is shown in FIG. 1. Each component shown in FIG. 1 may be implemented in hardware, software, or a combination thereof.

Figure 2:
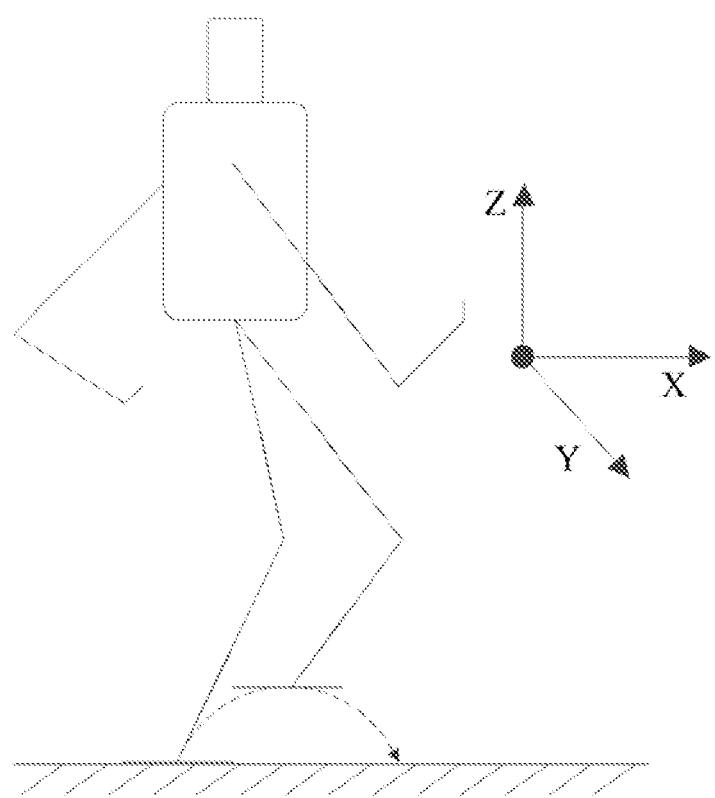
FIG. 2 is schematic diagram of a biped robot according to one embodiment.

FIG. 2 is a schematic diagram showing a biped robot. In this embodiment, the biped robot has a double-leg support state and a single-leg support state during the whole walking process. When the biped robot is in the double-leg support state, both leas of the biped robot are used as supporting legs to support the biped robot to maintain a standing state. When the biped robot is in the single-leg support state, one leg of the biped robot will be used as a supporting leg to support the biped robot to maintain the standing state, while the other leg will be used as a swing leg that changes the trajectory of movement. The change of the movement track of the swing leg includes the position change of the end of the swing leg (also referred to as "leg end") caused by the lifting action of the swing leg, the swinging action of the swing leg, and the landing action of the swing leg.

When the sole of a foot of a supporting leg is in contact with a support surface (i.e., floor, ground, etc.), a Cartesian right-handed coordinate system can be established with the contact point used as the origin. The coordinate system is the world coordinate system. The forward direction of the biped robot is the positive direction of the X axis of the coordinate system, and the positive direction of the Z axis is vertically upward and perpendicular to the support surface. The plane (also referred to as "pitch plane") formed by the X axis and the Z axis is the plane on which the biped robot can perform pitch change operations. The plane (also referred to as "rolling plane") formed by the Y axis and the Z axis is the plane on which the biped robot can perform roll changing operations. Any direction within the pitch plane is the pitch direction for the biped robot to perform pitch motion. Any direction within the rolling plane is the rolling direction in which the biped robot performs rolling motion. The angle between the pitch direction and the positive direction of the Z axis is the pitch angle at which the biped robot performs pitch motion, the angle between the rolling direction and the positive direction of the Z axis is the rolling angle at which the biped robot performs rolling motion.

As a result, the biped robot can determine the distribution of its parts in the entire world coordinate system based on the Cartesian right-handed coordinate system, and move each part of the robot to a determined position based on the Cartesian right-handed coordinate system after receiving a motion control command.

In the embodiments of the present disclosure, when a loss of balance is detected, the robot smooths the foot trajectory corresponding to the stability-maintaining step length that can restore the balance of the robot. The smoothed foot trajectory is then used to control the walking of the biped robot, thereby restoring the balance of the biped robot while avoiding the step leaping phenomenon of biped robot. The reliability of robot can thus be improved. Embodiments of the present disclosure provide a method for controlling the walking of a biped robot to achieve the foregoing objectives. The method will be described in detail below.

FIG. 3 shows an exemplary flowchart of a walking control method for a biped robot according to one embodiment. In one embodiment, the method may include the following steps.

Step S210: Detect whether the biped robot is in an unbalanced state.

In one embodiment, the processor 101 can obtain the operation state of the biped robot through sensors such as force sensors and pose sensors installed on the biped robot. Then, by analyzing the operation state, the processor 101 can determine whether the biped robot is currently in an unbalanced state.

Taking the use of pose sensor as an example, the processor 101 can obtain the pose angles of the biped robot through the pose sensors. The obtained pose angles can be compared a preset pose angle threshold, and when the pose angles are greater than or equal to the preset pose angle threshold, the processor can determine that the biped robot is currently in an unbalanced state.

Taking the use of force sensors as an example, the processor 101 can obtain the force applied on the biped robot through the force sensors. The obtained force can be compared with a preset force threshold, and when the force is greater than or equal to the preset force threshold, the processor 101 can determine that the biped robot is currently in an unbalanced state.

Step S220: In response to detection that the biped robot is in the unbalanced state, obtain a predicted balance step length corresponding to the biped robot in the unbalanced state.

In one embodiment, the predicted balance step length represents the predicted step length required for the biped robot to recover from an unbalanced state to a balanced state. The predicted balance step length can be calculated bye the processor 101, or obtained by the processor 101 from other step length prediction devices through a network. In one embodiment, when calculating the predicted balance step length, the biped robot can be abstracted into an inverted pendulum model, in which all the mass of the biped robot can be concentrated at the center of mass, and the two legs of the biped robot can be considered as two massless telescopic pendulums. Therefore, the force applied on the biped robot can be effectively expressed through the inverted pendulum model. Then, a swing leg capture point algorithm can be used to characterize the balance restoration requirements of the biped robot, so as to effectively constrain the step length attic biped robot in the process of walking, which can preliminarily predict the predicted balance step length.

Figure 4:
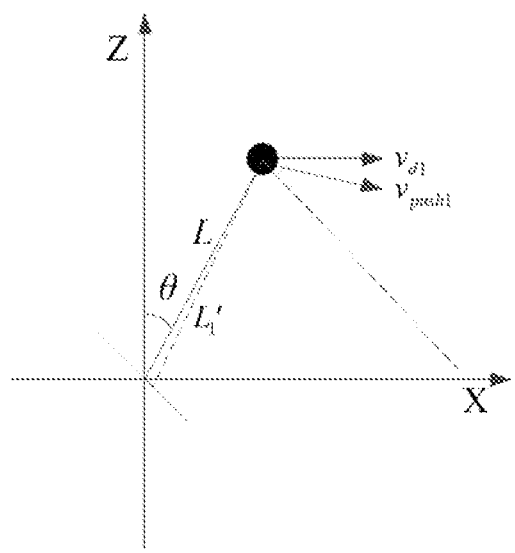
FIGS. 4 and 5 show an exemplary schematic diagram of force analysis of the biped robot.
Figure 5:
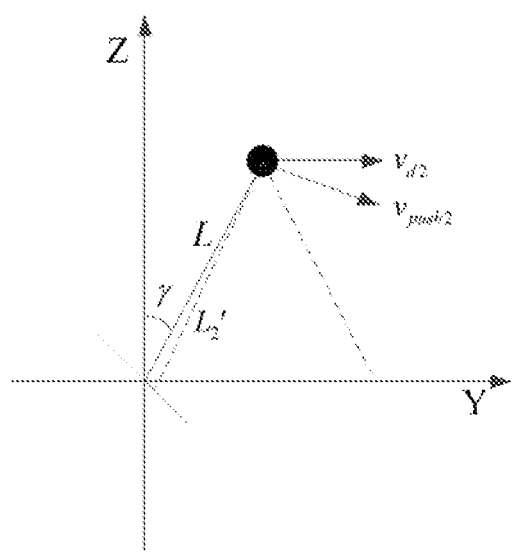
Figure 6:
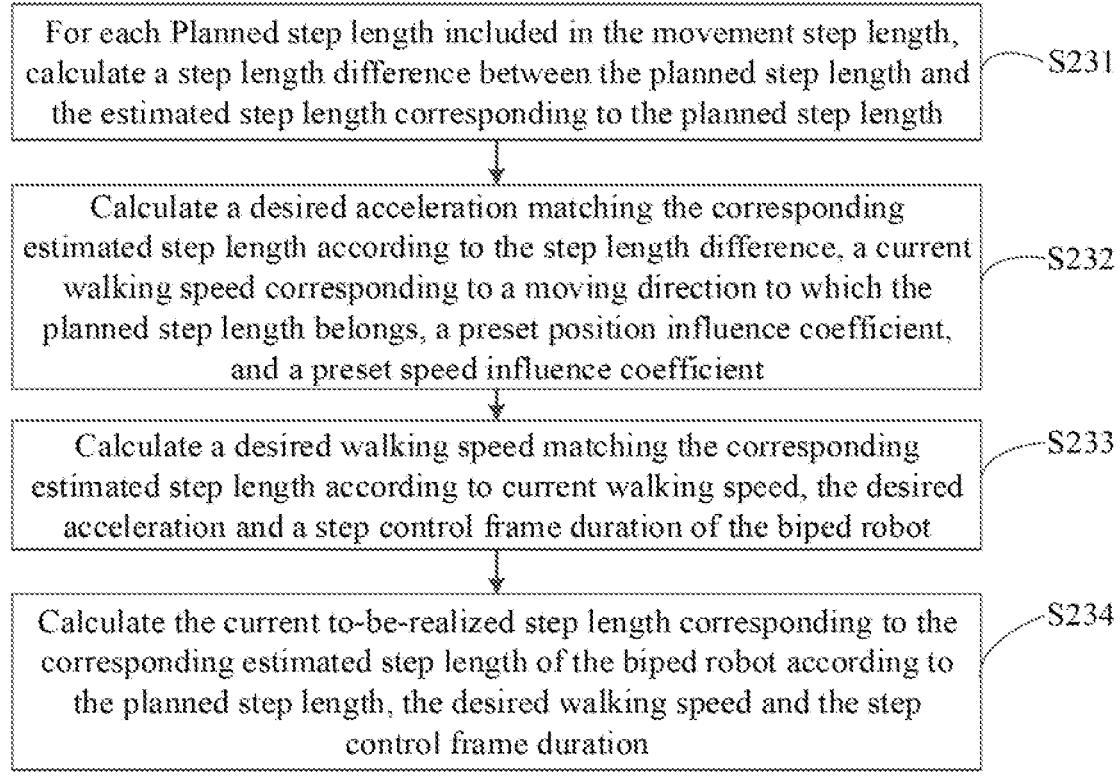
FIG. 6 is an exemplary flowchart of a method for performing a smooth transition processing on the predicted balance step length according to one embodiment.

FIGS. 4 and 5 shows a schematic diagram of force analysis of the biped robot. Specifically, the biped robot in the unbalanced state as shown in FIG. 4 will be subjected to the force component of the destabilization force in the direction of the pose change in the pitch direction. In this case, the first target speed of the biped robot in the pitch direction can be expressed by the following equations:

$$\begin{cases} v_1 = v_{d1} + v_{push1}\sin(\theta) \\ v_{push1} = L'_1\dot{\theta} \\ L'_1 = \sqrt{(L^2 + (l/2)^2)} \end{cases},$$

where $\dot{\theta}$ represents the pitch angular velocity of the torso of the biped robot in the pitch direction, $\theta$ represent the pitch angle of the torso of the biped robot in the pitch direction, L represent the leg length of the biped robot, l represents the length of a foot of the biped robot, $v_1$ represents the first target velocity of the biped robot in the pitch direction, $v_{d1}$ represents the desired velocity of the biped robot in the pitch direction, and $v_{push1}$ represents the velocity of the biped robot under the action of the force component corresponding to the pitch direction.

The biped robot in an unbalanced state as shown in FIG. 5 will be subjected to the force component of the destabilizing force in the direction of pose change in the roll direction. In this case, the second target speed of the biped robot in the roll direction can be expressed by the following equations:

$$\begin{cases} v_2 = v_{d2} + v_{push2}\sin(\gamma) \\ v_{push2} = L'_2\dot{\gamma} \\ L'_2 = \sqrt{(L^2 + (d/2)^2)} \end{cases}.$$

where $\dot{\gamma}$ represents the roll angular velocity of the torso of the biped robot in the roll direction, $\gamma$ represents the roll angle of the torso of the biped robot in the roll direction, d represents the foot width of the biped robot, L represents the leg length of the biped robot, $v_2$ represents the second target speed of the biped robot in the rolling direction, $v_{d2}$ represents the desired velocity of the biped robot in the rolling direction, and $v_{push2}$ represents the velocity of the biped robot under the action of the force component corresponding to the rolling direction.

When the calculation equations of the above-mentioned first target speed and the calculation formula of the second target speed are processed by the swing leg capture point algorithm to complete the effective constraint on the step length of the biped robot during the walking process, the corresponding calculated predicted balance step length can be regarded as composed of two step length components. Specifically, the predicted balance step length includes a precited step length of the biped robot in the pitch direction relative to the horizontal plane, and a predicted step length of the biped robot in the roll direction relative to the horizontal plane.

Step S230: Perform a smooth transition processing on the predicted balance step length according to a current movement step length of the biped robot to obtain a desired balance step length corresponding to the predicted balance step length.

In one embodiment, the movement step length represents the step length of the biped robot in an unbalanced state. In the force diagrams shown in FIGS. 4 and 5, a step length component can be separated, so that the movement step length can be regarded as composed of two step length components. In this case, the movement step length includes an planned step length of the biped robot in the pitch direction relative to the horizontal plane, and an planned step length of the biped robot in the roll direction relative to the horizontal plane.

When the processor 101 performs smoothing processing on the foot trajectory corresponding to the stability-maintaining step length used to restore the robot's balance, it can directly perform smooth transition processing on the stability maintaining step length. Then, the foot trajectory corresponding to the smoothed step length is adopted as the foot trajectory required for the biped robot to restore balance, thereby reducing the difference between the foot trajectory of the biped robot when it regains balance and the walking trajectory of the biped robot when it loses balance while allowing the biped robot to restore its balance. As a result, the step leaping phenomenon of biped robot can be avoided, and the reliability of robot can be improved.

In one embodiment, based on the basic idea of the PID (proportional-integral-differential) control algorithm and the current movement step length of the biped robot, a smooth transition processing, is performed on the predicted balance step length. Thus, a balanced desired step length that can be correlated with the current movement step length of the biped robot, avoiding step leaping and meeting the balance requirements of the robot, is finally obtained. The balanced desired step length includes two step length components. Specifically, the balanced desired step length may include the to-be-realized step length of the biped robot in the pitch direction relative to the horizontal plane, and the to-be-realized step length of the biped robot in the roll direction relative to the horizontal plane. The planned step length, the estimated step length, and the to-be-realized step length of the biped robot in the pitch direction corresponds to one another, and the planned step length, the estimated step length, and the to-be-realized step length of the biped robot in the roll direction corresponds to one another.

In one embodiment, step S230 may include the following steps.

Step S231: For each planned step length included in the movement step length, calculate a step length difference between the planned step length and the estimated step length corresponding to the planned step length.

For the planned step length included in the movement step length and corresponding to the pitch direction, the step length difference corresponding to the pitch direction may be obtained by calculating the difference between the planned step length and the estimated step length corresponding to the pitch direction included in the predicted balance step length.

For the planned step length included in the movement step length and corresponding to the roll direction, the step length difference corresponding to the roll direction may be obtained by calculating the difference between the planned step length and the estimated stet length corresponding to the roll direction included in the predicted balance step length.

Step S232: Calculate a desired acceleration matching the corresponding estimated step length according to the step length difference, a current walking speed corresponding to a moving direction to which the planned step length belongs, a preset position influence coefficient, and a preset speed influence coefficient.

The current walking speed represents the walking speed of the biped robot in the corresponding moving direction in an unbalanced state. The moving direction may include a positive X-axis direction corresponding to the pitch direction, and a positive Y-axis direction corresponding to the roll direction. The preset position influence coefficient represents an influence weight value of the corresponding step length difference in a smoothing process of the estimated step length, and the preset speed influence coefficient represents an influence weight value corresponding to the current walking speed in the smoothing process of the estimated step length.

For the estimated step length corresponding to the pitch direction, it needs to first solve the reverse speed of the current walking speed in the moving direction (i.e., positive direction of X-axis) corresponding to the pitch direction. The direction of the reverse speed is the negative direction of the X axis and the reverse speed is equal to the current walking speed. Then, the product of the step length difference related to the pitch direction and the preset position influence coefficient is calculated, and the product of the reverse speed related to the pitch direction and the preset speed influence coefficient is calculated. Finally, the sum of the aforementioned two products is used as the desired acceleration matching the estimated step length corresponding to the pitch direction.

For the estimated step length corresponding to the roll direction, it needs to first solve the reverse speed of the current walking speed in the moving direction (i.e., positive direction of Y-axis) corresponding to the roll direction. The direction of the reverse speed is the negative direction of the Y axis and the reverse speed is equal to the current walking speed. Then, the product of the step length difference related to the roll direction and the preset position influence coefficient is calculated, and the product of the reverse speed related to the roll direction and the preset speed influence coefficient is calculated. Finally, the sum of the aforementioned two products is used as the desired acceleration matching the estimated step length corresponding to the roll direction.

Step S233: Calculate a desired walking speed matching the corresponding estimated step length according to current walking speed, the desired acceleration and a step control frame duration of the biped robot.

The step control frame duration represents the unit control duration of the biped robot when performing a walking motion. For the estimated step length corresponding to the pitch direction, the product of the step control frame duration and the desired acceleration corresponding to the pitch direction (i.e., the desired acceleration matching the estimated step length corresponding to the pitch direction) can be calculated. Then, the calculated product is added to the current walking speed in the moving direction corresponding to the pitch direction (i.e., the positive direction of the X-axis), to obtain the desired walking speed matching the estimated step length corresponding to the pitch direction.

For the estimated step length corresponding to the roll direction, the product of the step control frame duration and the desired acceleration corresponding to the roll direction (i.e., the desired acceleration matching the estimated step length corresponding to the roll direction) can be calculated. Then, the calculated product is added to the current walking speed in the moving direction corresponding to the roll direction (i.e., the positive direction of the Y-axis), to obtain the desired walking speed matching the estimated step length corresponding to the roll direction.

Step S234: Calculate the current to-be-realized step length corresponding to the corresponding estimated step length of the biped robot according to the planned step length, the desired walking speed and the step control frame duration.

For the estimated step length corresponding to the pitch direction, the product of the step control frame duration and the desired walking speed corresponding to the pitch direction can be calculated. Then, the calculated product is added to the current step length corresponding to the pitch direction to obtain the to-be-realized step length that currently matches the estimated step length corresponding to the pitch direction of the biped robot.

For the estimated step length corresponding to the roll direction, the product of the step control frame duration and the desired walking speed corresponding to the roll direction can be calculated. Then, the calculated product is added to the current step length corresponding to the roll direction to obtain the to-be-realized step length that currently matches the estimated step length corresponding to the roll direction of the biped robot.

Thus, by performing the above-mentioned steps S231 to S234, the balanced desired step length correlated with the current movement step length of the biped robot, which can avoid step leaping and meet the balance requirements of the robot, can be obtained.

Step S240: Determine a planned leg trajectory of the biped robot according to the desired balance step length.

Figure 7:
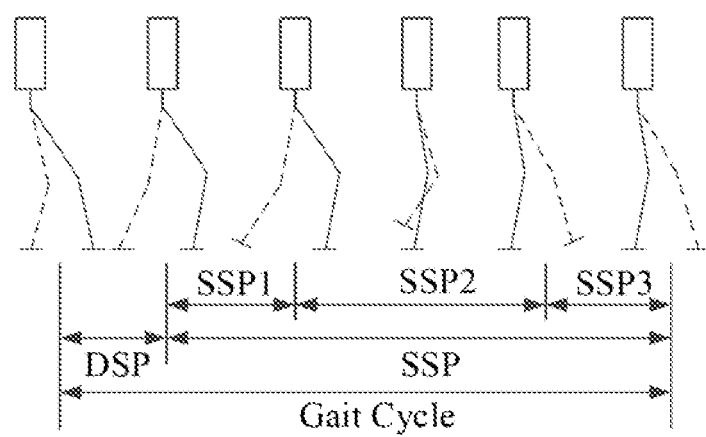
FIG. 7 is a schematic diagram of showing a gait cycle of the biped robot.

Referring to FIG. 7, in one embodiment, when the biped robot is in the state of double-kg support, there is a period of double-leg support (the time period corresponding to DSP in FIG. 7). In this case, the swinging leg of the biped robot the leg in dotted line in FIG. 7) have not yet left the ground, and can also play a supporting role to a certain extent. When the biped robot is in a single-leg support state, there is a corresponding single-leg support period (the time period corresponding to the SSP in FIG. 7). In this case, the single-leg support period cam be divided into three periods including the lifting period of the swinging leg (the time period corresponding to SSP1 in FIG. 7), the swinging period of the swinging leg (the time period corresponding to SSP2 in FIG. 7) and the landing period of the swinging leg (the time period corresponding to SSP3 in FIG. 7). Therefore, the gait cycle of the biped robot includes a double-leg support period and single-leg support period. It can be seen that the planned leg trajectory of the biped robot is related to the step length selected by the biped robot and the gait cycle of the robot. In one embodiment, the planned leg trajectory can be expressed by the following equations:

$$\begin{cases} X_L = \dfrac{L_x}{2} - \dfrac{L_x}{2}\cos(\pi t/T) \\ Y_L = \dfrac{L_y}{2} - \dfrac{L_y}{2}\cos(\pi t/T) \\ Z_L = at^3 + bt^2 + ct + d \end{cases},$$

where $X_L$ represents a projected position of the planned leg trajectory relative to the horizontal plane in the pitch direction, $Y_L$ represents a projected position of the planned leg trajectory relative to the horizontal plane in the roll direction, $Z_L$ represent a leg position of the planned leg trajectory in a vertical direction, $L_x$ represents the to-be-realized step length of the biped robot in the pitch direction relative to the horizontal plane, $L_y$ represents the to-be-realized step length of the biped robot in the roll direction relative to the horizontal plane, T represents a gait cycle of the biped robot, t represents a movement moment of the biped robot, and a, b, c and d represents preset leg-lift height coefficients of the biped robot, which are constants.

After the processor 101 obtains the balanced desired step length corresponding to the current unbalanced state of the biped robot, the balanced desired step length can be substituted into the above-mentioned equations to obtain the planned leg trajectory currently used by the biped robot for restoring balance.

Step S250: Control a current swing leg of the biped robot to move according to the planned leg trajectory.

When the processor 101 determines the planned leg trajectory that the biped robot should currently use to restore balance, it will correspondingly control the swing leg of the biped robot to move according to the planned leg trajectory, so that the biped robot can return to a balanced state, which can avoid the step leaping phenomenon of the robot, and improve the reliability of the robot.

Figure 8:
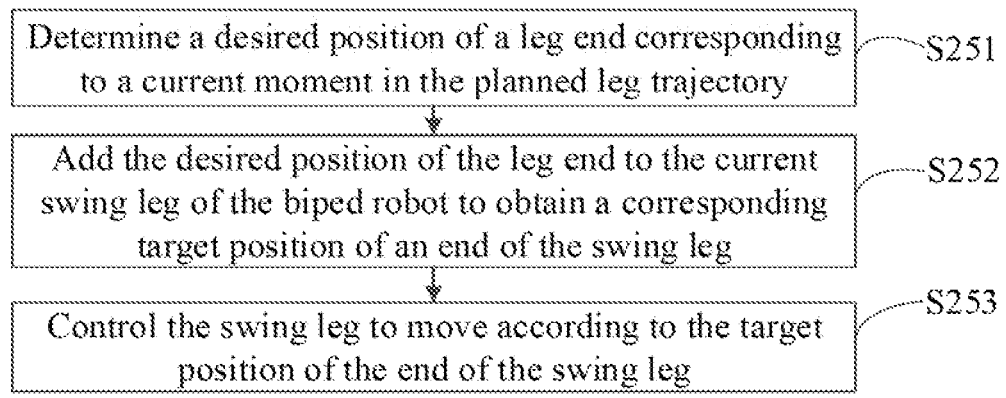
FIG. 8 is an exemplary flowchart of a method for controlling a current swing leg of the biped robot to move according to one embodiment.

Referring to FIG. 8, in one embodiment, step S240 may include the following steps.

Step S251: Determine a desired position of a leg end corresponding to a current moment in the planned leg trajectory.

Step S252: Add the desired position of the leg end to the current swing leg of the biped robot to obtain a corresponding target position of an end of the swing leg.

Step S253: Control the swing leg to move according to the target position of the end of the swing leg.

In one embodiment, the desired position of the leg end can be specified in the current Cartesian right-handed coordinate system, and then the specified position can be used as the target position of the end of the swing leg.

By performing the above-mentioned steps S210 to S250, the step trajectory corresponding to the stability-maintaining step length required when the biped robot loses balance is smoothed. After the biped robot is controlled according to the processed step trajectory, it can correspondingly restore the balance state, avoid the step leaping phenomenon of the biped robot, and improve the reliability of the robot.

It can be understood that, when the processor 101 controls the biped robot to restore balance, it can further avoid the generation of the step leaping phenomenon of the robot by continuously performing the above-mentioned method several times within one gait cycle, to ensure that the biped robot can be safely restored to a balanced state.

Referring to FIG. 9, in one embodiment, a robot walking control device 100 may include a balance detection module 110, a step length acquisition module 120, a step length smoothing processing module 130, a leg trajectory planning module 140, and a leg motion control module 150.

The balance detection module 110 is to detect whether the biped robot is in an unbalanced state. The step length acquisition module 120 is to, in response to detection that the biped robot is in the unbalanced state, obtain a predicted balance step length corresponding to the biped robot in the unbalanced state. The step length smoothing processing module 130 is to perform a smooth transition processing on the predicted balance step length according to a current movement step length of the biped robot to obtain a desired balance step length corresponding to the predicted balance step length. The leg trajectory planning module 140 is to determine a planned leg trajectory of the biped robot according to the desired balance step length. The leg motion control module 150 is to control a current swing leg of the biped robot to move according to the planned leg trajectory.

Figure 10:
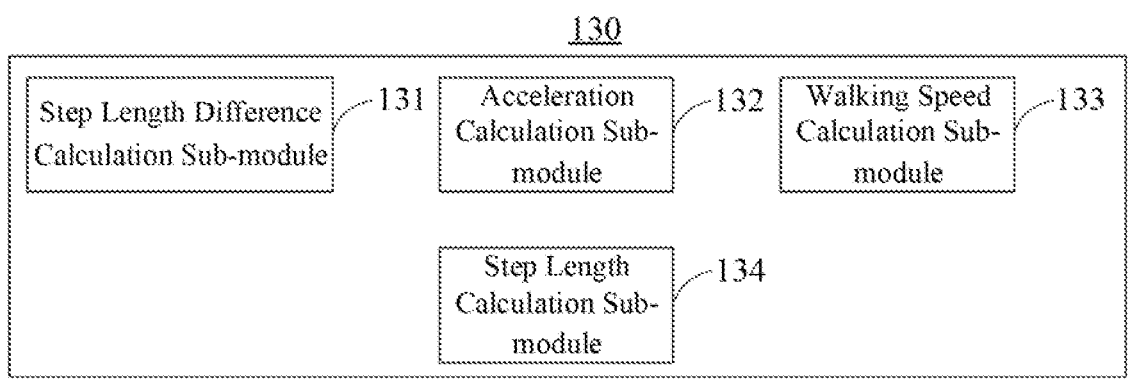
FIG. 10 is a schematic block diagram of step length smoothing processing module according to one embodiment.

In one embodiment, the current movement step length may include planned step lengths of the biped robot in a pitch direction and a roll direction relative to a horizontal plane respectively. The predicted balance step length may include estimated step lengths of the biped robot in the pitch direction and the roll direction relative to the horizontal plane respectively. The desired balance step length may include to-be-realized step lengths of the biped robot in the pitch direction and the roll direction relative to the horizontal plane respectively. The planned step length, the estimated step length, and the to-be-realized step length of the biped robot in the pitch direction corresponds to one another, and the planned step length, the estimated step length, and the to-be-realized step length of the biped robot in the roll direction corresponds to one another. Referring to FIG. 10, in one embodiment, the step length smoothing processing module 130 may include a step length difference calculation sub-module 131, an acceleration calculation sub-module 132, a walking speed calculation sub-module 133, and a step length calculation sub-module 134.

The step length difference calculation sub-module 131 is to: for each planned step length included in the movement step length, calculate a step length difference between the planned step length and the estimated step length corresponding to the planned step length.

The acceleration calculation sub-module 132 is to calculate a desired acceleration matching the corresponding estimated step length according to the step length difference, a current walking speed corresponding to a moving direction to which the planned step length belongs, a preset position influence coefficient, and a preset speed influence coefficient. The preset position influence coefficient represents an influence weight value of the corresponding step length difference in a smoothing process of the estimated step length, and the preset speed influence coefficient represents an influence weight value corresponding to the current walking speed in the smoothing process of the estimated step length.

The walking speed calculation sub-module 133 is to calculate a desired walking speed matching the corresponding estimated step length according to current walking speed, the desired acceleration and a step control frame duration of the biped robot. The step length calculation sub-module 134 is to calculate the current to-be-realized step length corresponding to the corresponding estimated step length of the biped robot according to the planned step length, the desired walking speed and the step control frame duration.

In one embodiment, the planned leg trajectory is expressed by the following equations:

$$\begin{cases} X_L = \dfrac{L_x}{2} - \dfrac{L_x}{2}\cos(\pi t/T) \\ Y_L = \dfrac{L_y}{2} - \dfrac{L_y}{2}\cos(\pi t/T) \\ Z_L = at^3 + bt^2 + ct + d \end{cases},$$

where $X_L$ represents a projected position of the planned leg trajectory relative to the horizontal plane in the pitch direction, $Y_L$ represents a projected position of the planned leg trajectory relative to the horizontal plane in the roll direction, $Z_L$ represent a leg position of the planned leg trajectory in a vertical direction, $L_x$ represents the to-be-realized step length of the biped robot in the pitch direction relative to the horizontal plane, $L_y$ represents the to-be-realized step length of the biped robot in the roll direction relative to the horizontal plane, T represents a gait cycle of the biped robot, t represents a movement moment of the biped robot, and a, b, c and d represents preset leg-lift height coefficients of the biped robot.

Figure 11:
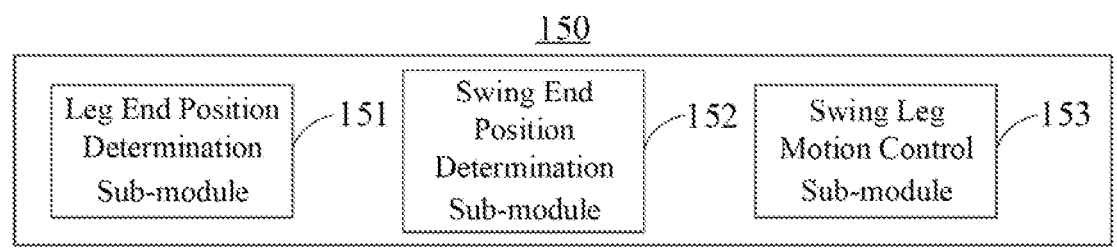
FIG. 11 is a schematic block diagram of a leg motion control module according to one embodiment.

Referring to FIG. 11, in one embodiment, the leg motion control module 150 may include a leg end position determination sub-module 151, a swing end position determination sub-module 152, and a swing leg motion control sub-module 153. The leg end position determination sub-module 151 is to determine a desired position of a leg end corresponding to a current moment in the planned leg trajectory. The swing end position determination sub-module 152 is to add the desired position of the leg end to the current swing leg of the biped robot to obtain a corresponding target position of an end of the swing leg. The swing leg motion control sub-module 153 is to control the swing leg to move according to the target position of the end of the swing leg.

It should be noted that the basic principles and technical effects of the robot walking control device 100 are the same as the aforementioned robot walking control method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium ma include volatile or non-volatile, magnetic, semiconductor, tape, optical, removable, non-removable or other types of computer-readable medium or computer-readable storage devices. For example, the computer-readable medium may be the storage device or the memory module having the computer instructions stored thereon as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It Will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part, in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solution in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and part displayed as units may or may not be physical units, may be located in one position, or may be distributed on a plurality of network units. Some or all of the modules may be selected according to actual requirements to achieve the objectives of the solutions of the embodiments.

The functional units and nodules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not take the nature of the corresponding technical solution depart from the spirit and scope of technical solutions of various embodiments of the present disclosure, and all should be included within the protection scope of the present disclosure.

What is claimed is:

1. A computer-implemented walking control method for a biped robot, comprising:
   detecting whether the biped robot is in an unbalanced state;
   in response to detection that the biped robot is in the unbalanced state, obtaining a predicted balance step length corresponding to the biped robot in the unbalanced state;
   performing a smooth transition processing on the predicted balance step length according to a current movement step length of the biped robot to obtain a desired balance step length corresponding to the predicted balance step length;
   determining a planned leg trajectory of the biped robot according to the desired balance step length; and
   controlling a current swing leg of the biped robot to move according to the planned leg trajectory.

2. The method of claim 1, wherein the current movement step length comprises planned step lengths of the biped robot in a pitch direction and a roll direction relative to a horizontal plane respectively, the predicted balance step length comprises estimated step lengths of the biped robot in the pitch direction and the roll direction relative to the horizontal plane respectively, the desired balance step length comprises to-be-realized step lengths of the biped robot in the pitch direction and the roll direction relative to the horizontal plane respectively, the planned step length, the estimated step length, and the to-be-realized step length of the biped robot in the pitch direction corresponds to one another, and the planned step length, the estimated step length, and the to-be-realized step length of the biped robot in the roll direction corresponds to one another;
   wherein performing the smooth transition process on the predicted balance step length according to the current movement step length of the biped robot to obtain the desired balance step length corresponding to the predicted balance step length, comprises:
   for each planned step length included in the movement step length, calculating a step length difference between the planned step length and the estimated step length corresponding to the planned step length;
   calculating a desired acceleration matching the corresponding estimated step length according to the step length difference, a current walking speed corresponding to a moving direction to which the planned step length belongs, a preset position influence coefficient, and a preset speed influence coefficient, wherein the preset position influence coefficient represents an influence weight value of the corresponding step length difference in a smoothing process of the estimated step length, and the preset speed influence coefficient represents an influence weight value corresponding to the current walking speed in the smoothing process of the estimated step length;
   calculating a desired walking speed matching the corresponding estimated step length according to current walking speed, the desired acceleration and a step control frame duration of the biped robot; and calculating the current to-be-realized step length corresponding to the corresponding estimated step length of the biped robot according to the planned step length, the desired walking speed and the step control frame duration.

3. The method of claim 2, wherein the planned leg trajectory is expressed by the following equations:

$$\begin{cases} X_L = \frac{L_x}{2} - \frac{L_x}{2}\cos(\pi t/T) \\ Y_L = \frac{L_y}{2} - \frac{L_y}{2}\cos(\pi t/T) \\ Z_L = at^3 + bt^2 + ct + d \end{cases}$$

where $X_L$ represents a projected position of the planned leg trajectory relative to the horizontal plane in the pitch direction, $Y_L$ represents a projected position of the planned leg trajectory relative to the horizontal plane in the roll direction, $Z_L$ represent a leg position of the planned leg trajectory in a vertical direction, $L_x$ represents the to-be-realized step length of the biped robot in the pitch direction relative to the horizontal plane, $L_y$ represents the to-be-realized step length of the biped robot in the roll direction relative to the horizontal plane, T represents a gait cycle of the biped robot, t represents a movement moment of the biped robot, and a, b, c and d represents preset leg-lift height coefficients of the biped robot.

4. The method of claim 1, wherein controlling the current swing leg of the biped robot to move according to the planned leg trajectory comprises:
   determining a desired position of a leg end corresponding to a current moment in the planned leg trajectory;
   adding the desired position of the leg end to the current swing leg of the biped robot to obtain a corresponding target position of an end of the swing leg; and
   controlling the swing leg to move according to the target position of the end of the swing leg.

5. A biped robot comprising:
   one or more processors; and
   a memory coupled to the one or more processors, the memory storing programs that, when executed by the one or more processors, cause performance of operations comprising:
   detecting whether the biped robot is in an unbalanced state;
   in response to detection that the biped robot is in the unbalanced state, obtaining a predicted balance step length corresponding to the biped robot in the unbalanced state;
   performing a smooth transition processing on the predicted balance step length according to a current movement step length of the biped robot to obtain a desired balance step length corresponding to the predicted balance step length;
   determining a planned leg trajectory of the biped robot according to the desired balance step length; and
   controlling a current swing leg of the biped robot to move according to the planned leg trajectory.

6. The biped robot of claim 5, wherein the current movement step length comprises planned step lengths of the biped robot in a pitch direction and a roll direction relative to a horizontal plane respectively, the predicted balance step length comprises estimated step lengths of the biped robot in the pitch direction and the roll direction relative to the horizontal plane respectively, the desired balance step length comprises to-be-realized step lengths of the biped robot in the pitch direction and the roll direction relative to the horizontal plane respectively, the planned step length, the estimated step length, and the to-be-realized step length of the biped robot in the pitch direction corresponds to one another, and the planned step length, the estimated step length, and the to-be-realized step length of the biped robot in the roll direction corresponds to one another;

wherein performing the smooth transition process on the predicted balance step length according to the current movement step length of the biped robot to obtain the desired balance step length corresponding to the predicted balance step length, comprises:
   for each planned step length included in the movement step length, calculating a step length difference between the planned step length and the estimated step length corresponding to the planned step length;
   calculating a desired acceleration matching the corresponding estimated step length according to the step length difference, a current walking speed corresponding to a moving direction to which the planned step length belongs, a preset position influence coefficient, and a preset speed influence coefficient, wherein the preset position influence coefficient represents an influence weight value of the corresponding step length difference in a smoothing process of the estimated step length, and the preset speed influence coefficient represents an influence weight value corresponding to the current walking speed in the smoothing process of the estimated step length;
   calculating a desired walking speed matching the corresponding estimated step length according to current walking speed, the desired acceleration and a step control frame duration of the biped robot; and
   calculating the current to-be-realized step length corresponding to the corresponding estimated step length of the biped robot according to the planned step length, the desired walking speed and the step control frame duration.

7. The biped robot of claim 6, wherein the planned leg trajectory is expressed by the following equations:

$$\begin{cases} X_L = \frac{L_x}{2} - \frac{L_x}{2}\cos(\pi t/T) \\ Y_L = \frac{L_y}{2} - \frac{L_y}{2}\cos(\pi t/T) \\ Z_L = at^3 + bt^2 + ct + d \end{cases}$$

where $X_L$ represents a projected position of the planned leg trajectory relative to the horizontal plane in the pitch direction, $Y_L$ represents a projected position of the planned leg trajectory relative to the horizontal plane in the roll direction, $Z_L$ represent a leg position of the planned leg trajectory in a vertical direction, $L_x$ represents the to-be-realized step length of the biped robot in the pitch direction relative to the horizontal plane, $L_y$ represents the to-be-realized step length of the biped robot in the roll direction relative to the horizontal plane, T represents a gait cycle of the biped robot, t represents a movement moment of the biped robot, and a, b, c and d represents preset leg-lift height coefficients of the biped robot.

8. The biped robot of claim 5, wherein controlling the current swing leg of the biped robot to move according to the planned leg trajectory comprises:
   determining a desired position of a leg end corresponding to a current moment in the planned leg trajectory;

adding the desired position of the leg end to the current swing leg of the biped robot to obtain a corresponding target position of an end of the swing leg; and controlling the swing leg to move according to the target position of the end of the swing leg.

9. A non-transitory computer-readable storage medium storing instructions that, when executed by at least one processor of a biped robot, cause the at least one processor to perform a robot walking control method, the method comprising:

detecting whether the biped robot is in an unbalanced state;

in response to detection that the biped robot is in the unbalanced state, obtaining a predicted balance step length corresponding to the biped robot in the unbalanced state;

performing a smooth transition processing on the predicted balance step length according to a current movement step length of the biped robot to obtain a desired balance step length corresponding to the predicted balance step length;

determining a planned leg trajectory of the biped robot according to the desired balance step length; and controlling a current swing leg of the biped robot to move according to the planned leg trajectory.

10. The non-transitory computer-readable storage medium of claim 9, wherein the current movement step length comprises planned step lengths of the biped robot in a pitch direction and a roll direction relative to a horizontal plane respectively, the predicted balance step length comprises estimated step lengths of the biped robot in the pitch direction and the roll direction relative to the horizontal plane respectively, the desired balance step length comprises to-be-realized step lengths of the biped robot in the pitch direction and the roll direction relative to the horizontal plane respectively, the planned step length, the estimated step length, and the to-be-realized step length of the biped robot in the pitch direction corresponds to one another, and the planned step length, the estimated step length, and the to-be-realized step length of the biped robot in the roll direction corresponds to one another;

wherein performing the smooth transition process on the predicted balance step length according to the current movement step length of the biped robot to obtain the desired balance step length corresponding to the predicted balance step length, comprises:

for each planned step length included in the movement step length, calculating a step length difference between the planned step length and the estimated step length corresponding to the planned step length;

calculating a desired acceleration matching the corresponding estimated step length according to the step length difference, a current walking speed corresponding to a moving direction to which the planned step length belongs, a preset position influence coefficient, and a preset speed influence coefficient, wherein the preset position influence coefficient represents an influence weight value of the corresponding step length difference in a smoothing process of the estimated step length, and the preset speed influence coefficient represents an influence weight value corresponding to the current walking speed in the smoothing process of the estimated step length;

calculating a desired walking speed matching the corresponding estimated step length according to current walking speed, the desired acceleration and a step control frame duration of the biped robot; and calculating the current to-be-realized step length corresponding to the corresponding estimated step length of the biped robot according to the planned step length, the desired walking speed and the step control frame duration.

11. The non-transitory computer-readable storage medium of claim 10, wherein the planned leg trajectory is expressed by the following equations:

$$\begin{cases} X_L = \frac{L_x}{2} - \frac{L_x}{2}\cos(\pi t/T) \\ Y_L = \frac{L_y}{2} - \frac{L_y}{2}\cos(\pi t/T) \\ Z_L = at^3 + bt^2 + ct + d \end{cases},$$

where $X_L$ represents a projected position of the planned leg trajectory relative to the horizontal plane in the pitch direction, $Y_L$ represents a projected position of the planned leg trajectory relative to the horizontal plane in the roll direction, $Z_L$ represent a leg position of the planned leg trajectory vertical direction, $L_x$ represents the to-be-realized step length of the biped robot in the pitch direction relative to the horizontal plane, $L_y$ represents the to-be-realized step length of the biped robot in the roll direction relative to the horizontal plane, T represents a gait cycle of the biped robot, t represents a movement moment of the biped robot, and a, b, c and d represents preset leg-lift height coefficients of the biped robot.

12. The non-transitory computer-readable storage medium of claim 9, wherein controlling the current swing leg of the biped robot to move according to the planned leg trajectory comprises:

determining a desired position of a leg end corresponding to a current moment in the planned leg trajectory;

adding the desired position of the leg end to the current swing leg of the biped robot to obtain a corresponding target position of an end of the swing leg; and controlling the swing leg to move according to the target position of the end of the swing leg.

* * * * *